Oct. 21, 1969     R. E. WHITE     3,474,255

MEANS TO DETECT AMOUNT AND DIRECTION OF SHAFT ROTATION

Filed April 11, 1966

INVENTOR.
ROBERT E. WHITE
BY James P. Malone

United States Patent Office 3,474,255
Patented Oct. 21, 1969

3,474,255
MEANS TO DETECT AMOUNT AND DIRECTION OF SHAFT ROTATION
Robert E. White, Westbury, N.Y., assignor to OPTOmechanisms, Inc., Plainview, N.Y.
Filed Apr. 11, 1966, Ser. No. 541,580
Int. Cl. G02f 1/18
U.S. Cl. 250—225
4 Claims

ABSTRACT OF THE DISCLOSURE

A first double polarization means is mounted on one shaft. The first polarization means has a first area, for instance, a center area of one polarization and an outer ring of a polarization displaced 90°, the two portions being fixed together. Light is passed through both areas and then through a second polarizing plate of a single polarization. Behind the second polarizing plate are mounted two photocell pickups, one to receive light from the first area and the second to receive light from the second area. The elements of the first polarizing means are adjusted so that equal light is passed through said areas, then if the first shaft is rotated in one direction, one photoelectric pickup will receive more light and the second photoelectric pickup will receive less light and vice versa.

---

This invention relates to means to detect amount and direction of shaft rotation using polarized light.

There are many instances where it is desirable to detect and provide an electrical output proportional to the relative rotation of two shafts or the rotation of one shaft with relation to a fixed index. The devices of the prior art of the synchro type or of the type generating a series of pulses to be counted, both of which are expensive and bulky.

The present invention provides means to detect the amount and direction of shaft rotation with a minimum of apparatus which may be extremely light weight.

In the present invention, the first polarization means is mounted on one shaft. The polarization means has a first area for instance, a center area of one polarization and an outer ring of a polarization displaced 90°, the two portions being fixed together.

Light is passed through both areas and then through a second polarizing plate of a single polarization. Behind the second polarizing plate are mounted two photocell pickups, one to receive light from the first area and the second to receive light from the second area. The elements of the first polarizing means are adjusted so that equal light is passed through said areas, then if the first shaft is rotated in one direction, one photoelectric pickup will receive more light and the second photoelectric pickup will receive less light and vice versa.

The amount of light difference is directly proportional to the amount of angular rotation.

Another embodiment of the invention is also shown wherein the first polarization plate is on a single polarization and the separate polarization is provided by a separate half wave plate.

Accordingly, a principal object of the invention is to provide new and improved means to detect direction and amount of angular rotation.

Another object of the invention is to provide new and improved means to detect direction and amount of angular rotation using polarization light means.

Another object of the invention is to provide new and improved light means for detecting angular rotation comprising means on a rotatable shaft providing two areas of different polarization and polarization sensitive means to detect the light received from these two areas.

Another object of the invention is to provide new and improved polarizing light means for detecting relative rotation of two rotatable shafts.

Another object of the invention is to provide new and improved means to detect direction and amount of shaft rotation comprising, first polarization means mounted on a rotatable shaft, said polarization means having a first area of a first polarization and a second area of a second polarization at 90° to said first polarization, a source of light mounted on one side of said polarizer and adapted to transmit light through said first and second areas, a stationary polarizer adapted to receive said light from said first polarizer, said stationary polarizer having a fixed polarization, a pair of photoelectric pickups mounted on the other side of said stationary polarizer, the first of said pickups being adapted to receive light passed through said first area and the second of said pickups being adapted to receive light passed through said second area, whereby if said shaft is rotated in one direction, said first pickup will receive more light and if said shaft is rotated in the other direction, said pickup will receive more light.

These and other objects of the invention will become apparent from the following specification and drawings of which:

Figure 1:
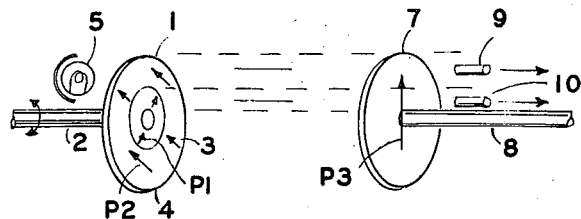
FIGURE 1 is an exploded perspective view of an embodiment of the invention.

Referring to the figures, the invention generally comprises a first polarization plate means 1 which is mounted on a rotatable shaft 2. The polarizing means 1 has a first center area 3 which has a first polarization P1 and a second outer ring area 4 having a second polarization P2 and which is 90° displaced from said first polarization. A source of light 5 is fixedly mounted and positioned to pass light through both areas 3 and 4.

The light then passes through a second polarization means 7 which has a single polarization P3. The second polarization means 7 may be mounted on the shaft 8 which may be rotatably mounted or locked in one position. Fixedly mounted beyond the other side of the plate 7 are a pair of photocells. The photocell 9 is adapted to receive light which is passed through the ring portion 4 and a second photocell 10 is adapted to receive light passed through the center portion 3.

Figure 2:
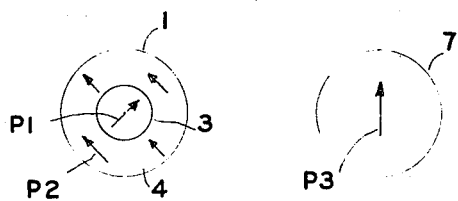
FIGURES 2, 3, 4 are diagrams illustrating the operation of the invention.
Figure 3:
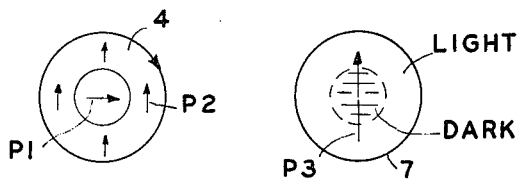
Figure 4:
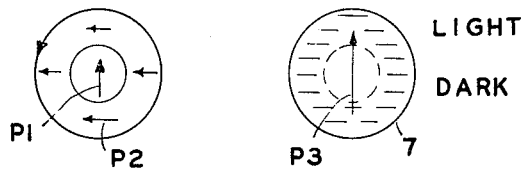

FIGURES 2, 3, 4 illustrate the operation of the embodiment of FIGURE 1. The polarization means 1 should be zero set so that there is equal intensity to the two photocells as shown in FIGURE 2.

Referring to FIGURE 3, the polarization plate 1 has been rotated clockwise so that the polarization P2 lines up with the polarization P3 of the element 7. At the same time, the polarization P1 is at 90° to the polarization P3. Therefore, the amount of light passing through the ring area 4 will be greater than that passing through the center area 3 and the output of the photocell 9 will be greater than that of the photocell 10.

FIGURE 4 shows the reverse operation wherein the member 1 is rotated counterclockwise. In this position the ring polarization P2 is at 90° to the polarization P3, and the center polarization P1 lines up with the polarization P3. Therefore, the center area will pass more light and the ring area will pass less light so that the photocell 10 will have a greater output than that of photocell 9.

The amount of light difference is a function of the amount of rotation.

Figure 5:
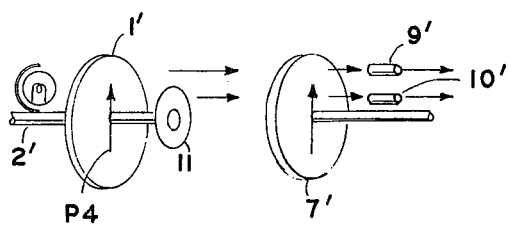
FIGURE 5 is a perspective view of a modification of the invention.

FIGURE 5 shows a modification of the invention in which a separate half wave plate 11 is used to provide the center polarization. In this embodiment a first polarization means 1' which is fixedly mounted to the shaft 2', has a single polarization P4 and half wave plate 11 is also fixedly mounted to the shaft 2' and has the property of rotating the polarization of the light 90°. Therefore, the operation of the second polarization means 7' and the photocells 9' and 10' will be exactly the same as previously described. Alternatively, the half wave plate may be the ring portion.

The system may be used to detect the relative displacement between a hand turned command shaft and a shaft connected to a load. The displacement or error signal is then used to drive a servo motor to keep the load shaft position synchronized with the handwheel without requiring the operator to supply any of the driving torques.

The advantages of this invention as as follows:

(1) The light source and light sensitive detectors need not be a part of the rotating assembly. These items may be mounted solidly on the base of the instrument, there is no physical or electrical connection between these parts and the rotating members.

(2) The two shafts do not require any mechanical connectors or electrical connections. An optical path between the two polarizers is the only requirement. The shafts may be displaced axially, radially, or skewed. For large displacements, an optical link may be used to transmit the information.

(3) System is insensitive to displacements, linear or angular, of the shafts except, of course, for angular rotation of the shafts about their axes. This eliminates the need for high accuracy machining tolerances and precision bearings.

(4) Use of a single light source results in a constant zero or null position with bulb voltage variation.

(5) System sensitivity is adjustable by changing the relative position of the ½ wave plate or third polarizing ring.

(6) Since the system does not depend on small slits or holes, large surface area sensors may be employed. This increases the possible power gain available and minimizes the effect of small imperfections on the polarizing surfaces.

I claim:

1. Means to detect direction and amount of shaft rotation comprising, first polarization means mounted on a rotatable shaft, said polarization means having a first area of a first polarization and a second area of a second polarization at 90° to said first polarization, a source of light mounted on one side of said polarizer and positioned to transmit light through said first and second areas, a second polarizer positioned to receive said light from said first polarizer, said second polarizer having a fixed polarization, a pair of photoelectric pickups mounted on the other side of said second polarizer, the first of said pickups being positioned to receive light passed through said first area and the second of said pickups being positioned to receive light passed through said second area, whereby if said shaft is rotated in one direction, said first pickup will receive more light and if said shaft is rotated in the other direction, said second pickup will receive more light.

2. Apparatus as in claim 1 wherein one of said areas has a ring shape.

3. Apparatus as in claim 1 wherein said second polarization means is mounted on a second rotatable shaft.

4. Apparatus as in claim 1 wherein said second polarization means is mounted on a stationary support.

References Cited

UNITED STATES PATENTS

| 2,165,974 | 7/1939 | Land | 350—153 |
|---|---|---|---|
| 2,167,484 | 7/1939 | Berry. | |
| 2,313,923 | 3/1943 | Chubb | 350—157 XR |
| 2,565,213 | 8/1951 | Falkenstein | 250—225 X |
| 3,054,204 | 9/1962 | Yates | 40—106.52 |
| 3,306,159 | 2/1967 | Beall et al. | |

FOREIGN PATENTS 1,002,616  8/1965  Great Britain.

OTHER REFERENCES

Shurcliff, W. A.: Polarized Light, Harvard Press, Cambridge, Mass., 1962, pp. 104–106.

RONALD L. WIBERT, Primary Examiner

T. MAJOR, Assistant Examiner

U.S. Cl. X.R.

350—159; 356—114